(12) United States Patent
Aoki

(10) Patent No.: US 7,137,472 B2
(45) Date of Patent: Nov. 21, 2006

(54) COLLISION DETECTING DEVICE AND PASSIVE SAFETY SYSTEM

(75) Inventor: Hiroshi Aoki, Ritto (JP)

(73) Assignee: Takata Corporation (JP)

( * ) Notice: Subject to any disclaimer, the term of this patent is extended or adjusted under 35 U.S.C. 154(b) by 48 days.

(21) Appl. No.: 10/405,175

(22) Filed: Apr. 2, 2003

(65) Prior Publication Data

US 2004/0020701 A1    Feb. 5, 2004

(30) Foreign Application Priority Data

Apr. 3, 2002  (JP) .............................. 2002-101425
Nov. 13, 2002  (JP) .............................. 2002-329751

(51) Int. Cl.
*B60K 28/10*   (2006.01)

(52) U.S. Cl. ..................... 180/274; 280/735; 701/45; 701/47

(58) Field of Classification Search ................ 280/734, 280/735; 180/271, 274; 701/45, 47
See application file for complete search history.

(56) References Cited

U.S. PATENT DOCUMENTS

| | | | | |
|---|---|---|---|---|
| 3,703,300 | A | * | 11/1972 | Gillund et al. ............... 280/735 |
| 3,792,874 | A | * | 2/1974 | Ayres et al. .................. 280/735 |
| 3,908,781 | A | * | 9/1975 | Oishi et al. ................... 293/117 |
| 4,346,914 | A | * | 8/1982 | Livers et al. ................. 280/735 |
| 4,995,639 | A | * | 2/1991 | Breed ........................... 280/735 |
| 5,080,188 | A | * | 1/1992 | Okuhara et al. ............. 180/282 |
| 5,145,208 | A | * | 9/1992 | Hoagland et al. ........... 280/734 |
| 5,326,133 | A | * | 7/1994 | Breed et al. ................. 280/735 |
| 5,364,158 | A | * | 11/1994 | Watanabe et al. ...... 296/187.09 |
| 5,584,510 | A | * | 12/1996 | Thuliez ........................ 280/784 |
| 6,047,985 | A |  | 4/2000 | Yoshida |
| 6,327,527 | B1 | * | 12/2001 | Imai et al. ..................... 701/45 |
| 6,426,567 | B1 | * | 7/2002 | Ugusa et al. ............... 307/10.1 |
| 6,561,301 | B1 | * | 5/2003 | Hattori et al. .............. 180/274 |
| 6,600,412 | B1 | * | 7/2003 | Ishizaki et al. ............. 340/436 |
| 6,607,212 | B1 | * | 8/2003 | Reimer et al. .............. 280/735 |
| 6,693,549 | B1 |  | 2/2004 | Stuetzler |
| 6,757,611 | B1 | * | 6/2004 | Rao et al. .................... 701/301 |
| 6,784,792 | B1 | * | 8/2004 | Mattes et al. ............... 340/436 |
| 6,882,916 | B1 | * | 4/2005 | Takafuji et al. ............... 701/45 |
| 2001/0028163 | A1 |  | 10/2001 | Breed |
| 2002/0033755 | A1 |  | 3/2002 | Ishizaki et al. |
| 2004/0011582 | A1 |  | 1/2004 | Aoki |

FOREIGN PATENT DOCUMENTS

DE    19962472 A1    7/2001
EP    0900702 A2    3/1999

(Continued)

*Primary Examiner*—Paul N. Dickson
*Assistant Examiner*—Toan C. To
(74) *Attorney, Agent, or Firm*—Fitch, Even, Tabin & Flannery

(57) ABSTRACT

A collision detecting device providing the accurate and early determination of a collision with a vehicle or the like and a passive safety system using this collision detecting device. A low-rigid portion and a crash box are arranged ahead of the high-rigid portion in a front portion of a frame. The front end of a rod is fixed to a bumper. The rod is inserted into a magnetic detector disposed on the high-rigid portion. In the rod, a number of magnets are aligned in the longitudinal direction of the rod such that their N poles and S poles are alternatively arranged. As a vehicle collides, the crash box is first deformed so that the rod moves backward, whereby a collision can be detected before large acceleration is generated.

27 Claims, 8 Drawing Sheets

FOREIGN PATENT DOCUMENTS

| | | |
|---|---|---|
| EP | 0937612 A2 | 8/1999 |
| EP | 0937612 A3 | 3/2000 |
| EP | 0900702 A3 | 4/2001 |
| EP | 1 168 824 A2 | 1/2002 |
| JP | 9-175318 | 7/1997 |
| JP | 11-78770 | 3/1999 |
| JP | 2001-171476 | 6/2001 |
| JP | 2002-36994 | 2/2002 |
| JP | 2002-36995 | 2/2002 |
| WO | WO-01/55729 A2 | 8/2001 |
| WO | WO-01/55729 A3 | 8/2001 |

\* cited by examiner

COLLISION DETECTING DEVICE AND PASSIVE SAFETY SYSTEM

FIELD OF THE INVENTION

The present invention relates to a collision detecting device for detecting a vehicle collision and a passive safety system, such as an airbag device or a seat belt device using the same.

BACKGROUND OF THE INVENTION

Airbag devices for protecting an occupant by inflating an airbag during a vehicle collision, and pretensioners for removing a slack of a webbing of a seat belt device by rapidly winding up a predetermined length of the webbing are well known. For activating such an airbag device or a pretensioner, it is required to determine the occurrence of a vehicle collision and the magnitude of the vehicle collision (crash severity). The crash severity correlates with the relative velocity to the object and the mass and the rigidity of the object.

Conventionally, the acceleration is detected for determining the magnitude of the collision. For example, in Japanese Patent Unexamined Publication No. 11-78769, the crash severity is determined on the bases of the magnitude of acceleration, the variation with time of the acceleration, and the variation with time of the velocity. In this publication, the variation with time of the velocity is obtained from the values by integrating the acceleration with time. It also should be noted that the protection of an occupant will be sometimes referred to as "restraint". In addition, acceleration means acceleration (the derivative with respect to time of speed) acting on a vehicle in the decelerating direction during a collision.

A collision determining method by detecting the deformation of an exterior member of a vehicle due to the collision is disclosed in Japanese Patent Unexamined Publication No. 11-78770. Distortion sensors are mounted on the exterior member of the vehicle so as to detect the deformation amount and the deformation speed of the exterior member, thereby determining the magnitude of the collision.

A collision determining method by detecting the deformation speed of a front part of a vehicle during deformation of the vehicle body due to the collision is disclosed in Japanese Patent Unexamined Publication No. 2001-171476. According to this publication, acceleration sensors are disposed at two predetermined locations on a vehicle body so as to detect the compressive deformation speed of the vehicle body between the two sensors, thereby determining the magnitude of the collision.

In the conventional systems, the determination of collision is carried out by signals from an acceleration sensor located in a vehicle cabin. The acceleration sensor placed in the vehicle cabin is suitable for judging the full perspective impact pulse applied to an occupant by the vehicle collision. Since the location is far from the front, the delay in time for collision determination is improved by placing another acceleration sensor at a location near the front.

In a typical airbag device, it takes time from 30 milliseconds to 40 milliseconds to fill an airbag with gas so that the airbag is sufficiently developed. Therefore, it is required to detect the occurrence of a collision and, then, activate an occupant protective device before a large impact is transmitted to the occupant.

In case of a typical sedan, the duration of an impact pulse due to a collision against a full-overlap barrier at a velocity of 50 kilometers per hour (km/h) is on the order of 70 milliseconds to 100 milliseconds (this is the amount of time it takes for the velocity to become zero). Of course, it is necessary to activate the occupant protective device before the occupant collides with a vehicle cabin portion by forward movement. The amount of time for which the occupant moves forward about 10 centimeters (cm) relative to the vehicle body is on the order of 50 milliseconds after collision at an impact velocity of 50 kilometers per hour. For ensuring the airbag to function as an occupant protective device, it is required to judge the occurrence of a collision and output an activation signal within 20 milliseconds after collision. In case of collision at a velocity of 50 kilometers per hour, the crashing stroke of a front end of a bumper is on the order of 13 centimeters after 10 milliseconds from collision and on the order of 25 centimeters after 20 milliseconds from collision. During the first 5 milliseconds after collision, the bumper receives impact so as to create an impact pulse. After 10 m sec., the interference between the impact barrier and the main frame of the vehicle body starts to create a large impact pulse.

Even with a collision at a velocity of 18 kilometers per hour (such a collision does not always need the activation of the airbag), an impact pulse is created because of the crashing of a bumper. The control system is provided with a function to determine whether to activate the airbag within 20 milliseconds after collision, without reacting to such a minor collision, by detecting the deceleration of the vehicle as a whole with the force received by the front end of the bumper.

In the collision determining method by detecting the acceleration disclosed in Japanese Patent Unexamined Publication No. 11-78769, the result of collision determination and crash severity is affected by the structure of a vehicle around a collided portion, the rigidity of the object, and the like.

In the collision determining method disclosed in Japanese Patent Unexamined Publication No. 11-78770, the deflection speed of the exterior member can be detected by the sensors mounted on the exterior member. However, the detected deflection speed is not always the deformation speed of the vehicle body structure in an impact loading direction. In addition, since the deformation stroke of the exterior member is generally short, it is difficult to detect the deformation speed as the collision deformation progresses.

Therefore, it is difficult to determine in an early stage of collision whether the collision is a collision between the vehicle and a small-mass high-velocity object, with which only the exterior member is deformed (a collision not creating such a vehicle deceleration that occupant restraint by a passive safety system is needed) or a medium-velocity barrier collision, with which the vehicle body is largely deformed (a collision creating such a vehicle deceleration that occupant restraint by a passive safety system is needed). That is, it is difficult to determine the occurrence of a collision and the crash severity from the deformation speed of the exterior member.

The collision determining method disclosed in Japanese Patent Unexamined Publication No. 2001-171476 is not a method of detecting the deformation speed of the vehicle front end portion. As one of the acceleration sensors is located at the vehicle front end, an excess impact over the rated value of the sensor is exerted on the sensor in an early stage of a collision so that the mounting portion of the sensor is deformed, thus shifting off the detection axis of the sensor.

With the shifted detection axis of the sensor, the deformation speed of the vehicle front end can not be properly detected.

The systems mentioned in the above have a number of shortcomings. For example, there is poor stability in collision determination. It is desired to activate a restraint device at a proper timing for every type of collision. However, the configuration, the rigidity, and the velocity of a collided object actually differ from collision to collision. For instance, in cases where the configuration of a collision barrier is offset or center pole, the impact at the early stage of collision is small so as to delay the collision determination unnecessarily. In cases of pole collision, the impact at the early stage is small, but a large impact is created after that. In this case, the collision delay determination degrades the restraint performance.

Since an airbag is filled with high-pressure and high-temperature gas for 30 milliseconds by igniting powder, the airbag has large energy during deployment. During the deployment, if the airbag collides with an occupant, a large force is exerted on the occupant. To reduce this result, it is desired to shorten the time for the collision determination so as to lengthen the time to be used for deployment of the airbag, thereby reducing energy of gas for deployment. In the conventional sensor system, to prevent the restraint device from activating due to a large impact pulse created by a low-grade collision, running on a rough road, or bumping of the engine against a curb, the time for the collision determination should be on the order of 15 milliseconds that is longer than the duration of the pulse. The technology for shortening the time almost reaches the boundary.

In addition, there is difficulty in determining the crash severity. Occupant protective devices have been improved to increase the safety for every person having a large body or a small body. An airbag with high pressure is needed for sufficiently restraining an occupant having a large body against a sever collision at high velocity. On the other hand, airbag with high pressure is not needed for softly receiving an occupant having a small body in case of a collision at moderate velocity. To satisfy this, a passive safety system which has a choice between two levels in controlling the amount of gas to be supplied into the airbag has been introduced. If the crash severity can properly be determined at an early stage by a collision detecting means, the pressure of the airbag can be controlled according to the crash severity, thereby further improving the performance of the occupant protective device. Therefore, it is desired to provide a high-precision detecting means.

Improved body structures for controlling the crash property has been employed. The structure of the front end is configured to absorb energy when encountering a predetermined force. Even with any crash severity, this configuration mitigates the deceleration acting on the vehicle body at an early stage of collision. Therefore, it is difficult to determine the crash severity with high precision at an early stage of collision by the conventional means, because there is no large variation in impact pulse at the early stage.

SUMMARY OF THE INVENTION

It is an object of the present invention to provide a collision detecting device which can determine the occurrence of a collision and the magnitude of the collision (crash severity) at an early stage with high precision by detecting the collision deformation speed at ends of a vehicle body, and to provide a passive safety system using this collision detecting device. A collision detecting device of the present invention comprises a deformation speed detector for detecting a deformation speed of at least a portion around an end or side of a vehicle body. This collision detecting device can be used to activate a passive safety system on the basis of a signal.

It is important to determine the magnitude and the time of acceleration (deceleration) from the start of a vehicle collision at an early stage. The object of the present invention is to detect (or estimate) such information at an early stage with high precision. On the basis of the detection result, the determination of a collision occurrence and the magnitude of the collision by the collision detecting device of the present invention is carried out.

According to the present invention, when a vehicle comes into a frontal collision, the determination of the occurrence of a collision and the magnitude of the collision is allowed by detecting the deformation speed of a portion around the front end of the vehicle. Since, during the frontal collision, the portion around the front end of the vehicle first collides with an object so as to initiate compressive deformation, the compressive deformation speed of the front end portion of the vehicle structure is detected, whereby the occurrence and the magnitude of the collision can be determined at the early stage.

Though acceleration acts on the vehicle due to the collision, the acceleration varies depending on the rigidity of the portion of the vehicle body that is being deformed by the collision. For example, the reduction in vehicle velocity is gentle when the deformed portion has low rigidity so that the acceleration acting on the vehicle is small. On the other hand, the reduction in vehicle velocity is drastic when the deformed portion has high rigidity so that the acceleration acting on the vehicle is large.

When the front end portion of the vehicle body is structured to have relatively low rigidity in order to absorb impact during a collision, the acceleration to be detected is small at a very early stage when the front end portion starts to be deformed, so that the collision detecting accuracy is relatively low. According to the deformation speed detecting method of the present invention, however, the deformation speed of the front end portion is detected so that a large deformation speed is detected even at a very early stage when only the front end portion is deformed. Therefore, the occurrence of a collision and the magnitude of the collision can be determined at a high precision.

To detect the deformation speed of a portion around an end of a vehicle, it is preferable to detect variations with time in distance between a first portion at a relatively outer position (for example, front position) around the end and a second portion at a relatively inner position (for example, rear position) for a predetermined distance from the first portion. That is, to detect the approaching speed of the first and second portions.

To detect the approaching speed of the two portions, the moving speeds of rods laid to extend between the two portions may be detected or the distance between the two portions may be measured by using electric waves, infrared rays, or ultrasound. The method of detecting the approaching speed is not limited thereto.

If the vehicle body has an impact absorbing structure and comprising a relatively low-rigid member near an outermost position and a relatively high-rigid member at an inner position relative to the low-rigid member, it is preferable that the first portion is arranged on the low-rigid member and the second portion is arranged on a high-rigid member, thereby achieving the stable detection of the deformation speed.

Even if an outer portion and an inner portion of the vehicle structure (body frame) have the same rigidity, the deformation proceeds sequentially from the outer portion to the inner portion in the vehicle structure during a collision. Therefore, the deformation speed to be detected can be obtained from the relative displacement between the first portion and the second portion and from the speed of the displacement.

The deformation speed detecting means are disposed on left and right front portions of the vehicle, respectively, thereby facilitating the determination of a full-overlap collision and an offset collision.

According to an embodiment of the present invention, it is determined that a collision with a magnitude exceeding a predetermined value, e.g. a collision with such a magnitude as to actuate a passive safety system, such as an airbag device, has occurred when a deformation speed exceeding a predetermined value is detected for a predetermined period of time. This method is simple and enables the determination of a collision at the early stage of a collision.

According to another embodiment of the present invention, the deformation speed and the acceleration are detected. On the basis of the deformation speed and the acceleration, it is determined that a collision with a magnitude exceeding a predetermined value has occurred. For example, when both the deformation speed and the acceleration exceed their respective predetermined values or when either one of the deformation speed and the acceleration exceeds the corresponding predetermined value, it is determined that a collision with a magnitude exceeding a predetermined value has occurred. The determination method has high reliability on determination result and enables the determination of the crash severity with high precision or at the early stage.

According to still another embodiment of the present invention, the deformation speed, the acceleration, and the deformation amount are detected. On the basis of the deformation speed, the acceleration, and the deformation amount, it is determined that a collision with a magnitude exceeding a predetermined value has occurred. For example, when all of the deformation speed, the acceleration, and the deformation amount exceed their respective predetermined values, it is determined that a collision with a magnitude exceeding a predetermined value has occurred. The determination method has further high reliability on determination result.

According to a different embodiment of the present invention, the determination of a collision is made on the basis of the acceleration and the criteria of collision determination is changed according to the deformation speed detected by the deformation speed detecting means. For example, when the deformation speed is large, the threshold value of collision determination is set to be lower. On the other hand, when the deformation speed is small, the threshold value of collision determination is set to be higher. Therefore, it is enables to determine the occurrence of a collision at an early stage or with high precision.

If the deformation stress of portions, which may be compressed by load generated by a collision and thus elastically deformed or plastically deformed, are previously known, the work required for deformation of the vehicle can be detected from a product of the deformation speed of the portion around the end of the vehicle, the deformation amount per a predetermined time, and the deformation stress of the deformed portion. The deformed portion may be an end portion of the vehicle including a bumper beam, bumper fixing arms, and front forks on sides of the vehicle.

According to another embodiment of the present invention, the collision magnitude is determined on the basis of the work required to deform a portion around an end of the vehicle. That is, since the maximum value of the deformation speed correlates with the relative velocity and a value, which is obtained by dividing the work by a square value of the difference speed of the deformation speed in the predetermined time, correlates with the working mass, the relative velocity between a vehicle and an object colliding with the vehicle and the working mass can be estimated at the start of the collision. Based on the relative velocity and the working mass, it can be determined how large the acceleration (deceleration) acting on the vehicle after a lapse of a time will be, that is, the collision magnitude can be determined.

In this embodiment, the acceleration acting on the vehicle may also be detected, and the collision magnitude may be determined on the basis of the acceleration and the work. When the acceleration of the vehicle is small, the weight of the object colliding with the vehicle can be estimated from the working mass because the working mass corresponds to the equivalent mass of the object.

For sensing a frontal collision by using the acceleration, deformation speed detecting means are placed on the front end of the vehicle and detect the distance or the variation in distance in the vehicle longitudinal (front-to-back) direction between a deforming portion, including a peripheral structure, and a stationary portion due to deformation of the vehicle. The deforming portion may be a front frame or an end of a side frame of the vehicle, including at least a bumper, a bumper beam, and bumper fixing arms. The aforementioned acceleration detecting means is placed on a side frame at an inner position relative to the front portion of the vehicle or a vehicle structural portion on the rear side relative to the side frame.

According to a further different embodiment of the present invention, the deformation speed and the deformation amount are detected, and on the basis of these detected values, it is determined that a collision with a magnitude exceeding a predetermined value has occurred. For example, when both the deformation speed and the deformation amount exceed their respective predetermined values, or when the detected deformation amount exceeds its predetermined value during the deformation speed exceeding its predetermined value is detected, or when either one of the deformation speed and the deformation amount exceeds the corresponding predetermined value, it is determined that a collision with a magnitude exceeding a predetermined value has occurred. The determination method is easy and enables the determination of the crash severity at an early stage of collision with high precision.

Because the result of collision determination can be obtained with sufficient precision and at an early stage, the actuation of the airbag device can be made earlier. Therefore, the utilization of a small capacity inflator for inflating an airbag with large volume is achieved.

Since the collision magnitude can be determined at an early stage with high precision according to the present invention, the timing for actuating passive safety systems, such as an airbag device, can be easily controlled. In addition, according to the determination, the inner pressure of the airbag can be controlled, and/or the amount of webbing to be wound by a pretensioner can be controlled.

The collision detecting device of the present invention may determine the magnitude of collision and may further comprise an output means which can output reference signals corresponding to the magnitude of collision. This structure further facilitates the control of the passive safety systems.

As mentioned above, in case of also determining the type of collision, such as a full-overlap collision and an offset collision, the airbag device and/or the pretensioner can be controlled to have various patterns.

In another embodiment of the present invention, the vehicle comprises a bumper beam and a bumper cover disposed on the outer side of the bumper beam, the deformation speed detecting means detects the deformation speed of a space between the bumper beam and the bumper cover in a direction toward inside of the vehicle due to a collision with an object. Since the deformation speed of the space in front of the bumper beam is detected, the collision can be detected earlier than the conventional collision sensor, which is placed at an inner side of the vehicle frame. By detecting the progress of a collision with the deformation speed, impact force to be applied soon on the bumper or the frame can be estimated, thereby shortening the time for collision determination. By estimating the relative velocity from the deformation speed, the timing for actuating a restraint system can be estimated, thereby improving the performability of the collision detecting device.

The principle of collision determination by the collision detecting device will now be described.

FIGS. 15(a), 15(b) schematically illustrate outputs of the acceleration sensor in a vehicle cabin and the deformation speed sensor of the present invention according to the velocity during collisions. In FIGS. 15(a), 15(b), "minor collision" means such a collision at a very low velocity that does not need the activation of a restraint system. The deceleration acting on the acceleration sensor within 10 milliseconds from a collision does not have large reaction force because of buckling of crashable elements, such as a bumper cover and a bumper. Difference enough for determining whether the velocity is such a velocity that needs the actuation of the restraint system or cannot be obtained until large buckling of a body starts after the lapse of 15 milliseconds. On the other hand, the deformation speed detected by the collision detecting device of the present invention generates an output in proportion to the collision velocity within 10 milliseconds.

In case of a collision with a hard and heavy object, such as a vehicle, the output from the crashing speed of a front end portion of the bumper is substantially in proportion to the relative velocity between the vehicle and the object.

In case of a collision with a soft object, the deformation speed is smaller than the relative velocity. In case of a collision with an object having small mass, even though the object is hard and the relative velocity is at high velocity, the crashing speed drops suddenly after the start of the collision. Therefore, the crashing speed profile of the end of the bumper includes a difference whether a collision is such a collision that needs the activation of a restraint system. Accordingly, the collision detecting device of the present invention can determine a collision (collision velocity) in a short time with accuracy.

The determination whether the actuation of the restraint means is needed or not depends on the crash severity. In case of a collision with a fixed barrier, the crash severity is substantially equivalent to the collision velocity. In an actual collision, however, the crash severity can not decided only from the running velocity of the vehicle. The crash severity varies according to interaction among the own running velocity, the velocity and the mass of a collided object. For this, it is important that, in addition to the relative velocity detected at the front portion of the bumper, the crashing speed of the bumper beam is continuously detected and the progress of crash due to the collision is detected. Since the bumper beam has a certain degree of rigidity, the crashing speed of the bumper beam includes information about the crash severity.

To estimate the crash severity in an early stage of a collision, it is required to know the relative velocity between the own vehicle and an object and the working mass of the object. By using the collision detecting device of the present invention, it is found that the relative velocity RV between the own vehicle and the object is higher than the deformation speed obtained by the collision detecting device. The working mass of the object is obtained from the reaction force exerted to the object by the own vehicle and the variation in velocity per a unit time of the object.

Since the deformation strength Fd of the bumper of the own vehicle is previously known, it is found that the reaction force exerted is at least more than Fd. The variation in velocity per a unit time of the object can be estimated from the deformation speed of the collision detecting device (or the deceleration obtained from the output of the acceleration sensor within the vehicle cabin) when it is assumed that the velocity of the own vehicle is constant in an early stage of the collision.

In case of a collision with a stationary object, it is estimated that the deformation speed is closer to the velocity of the own vehicle, the object is harder and heavier. Even with a moving object, it is also estimated that the deformation speed is increased or the reduction rate after the deformation speed is increased is smaller, the object is heavier and harder.

Though the relative velocity and the working mass may be directly obtained from the deformation amount and the deformation speed, it is natural in a computing process of a detecting algorithm that the deformation amount and the area of section are calculated from the deformation amount profile and the deformation speed profile so as to compute values relating to the relative velocity and working mass. By using the collision detecting device of the present invention, the relative velocity between the own vehicle and the object and the working mass of the object can be estimated, thereby determining the crash severity at an early stage of the collision.

It is preferable that the deformation speed detecting means continuously detects the deformation speed of the space from variation in volume of the space. Since the variation in volume of the space is detected, the deformation speed in proportion to the size and the rigidity of the collided object can be detected even though the collided object has different direction and configuration.

It is also preferable that the vehicle has an impact receiving member which is deformed or displaced due to a collision and which is disposed at the outer side of the bumper beam, and the deformation speed detecting means has a means for continuously detecting the deformation speed of the space from the displacement of the impact receiving member relative to the bumper beam or the vehicle frame. Since the impact receiving member is disposed at the outer side of the bumper beam, the direction for detecting the impact displacement of the space is limited, whereby the deformation speed can be measured with high precision.

The impact receiving member may be located within the space and the impact receiving member may compose a part of the bumper cover. By incorporating the impact receiving member into the bumper cover or incorporating a characteristic as an impact receiving member into the bumper cover, the assembly and maintenance can be facilitated.

The impact receiving member may be partially located outside of the bumper cover. In this case, early detection of a collision is achieved.

The impact receiving member has such rigidity that impact received during the collision or displacement is transmitted to the entire impact receiving member. In this case, high-precision detection of the deformation speed is achieved relative to various collided positions.

The impact receiving member may have such a characteristic that a collided portion is mainly deformed. According to this structure, the position of a collided portion can be easily detected. Since the impact receiving member has flexible structure, the impact receiving member has a high degree of freedom of mounting to the bumper.

It is preferable that the collision detecting device comprises an estimation means for estimating the relative velocity, between the vehicle and an object with which the vehicle comes in frontal collision, or the working mass of the object, on the basis of the deformation speed profile obtained by the deformation speed detecting means and the load-deformation characteristic of the space. According to this structure, the progress of the collision can be detected from the deformation speed, and the relative velocity between the own vehicle and the object, and the working mass of the object can be assayed from the deformation amount and load-deformation characteristic (F-S characteristic), thereby improving the precision of collision determination. It is preferable that the collision detecting device comprises a means for carrying out at least one of the determination on whether to actuate a vehicle occupant protective device, the determination of the actuation timing, and the selection of protective devices, on the basis of the results obtained by the deformation speed detecting means and the estimation means.

It is preferable that the deformation speed detecting means continuously detects the deformation speed of the bumper beam or a front portion of the vehicle frame on the basis of the deformation speed of the space. According to this structure, the deformation speed including the crash of the bumper beam is assayed, thereby further improving the precision of the collision determination. In this case, the collision detecting device may comprise an evaluating means, which evaluates a deformed space on the basis of the deformation amount obtained from the detection result by the deformation speed detecting means, a relative velocity estimating means, which estimates the relative velocity between the vehicle and an object with which the vehicle comes in frontal collision on the basis of the deformation speed of the space, and a crash severity estimating means, which estimates the crash severity on the basis of the deformation speed of the space. According to this structure, the relative velocity between the own vehicle and the object and the working mass of the object can be assayed, thereby further improving the precision of the determination of the occurrence of collision and the crash severity. In this case, the evaluating means may comprise a means for carrying out at least one of the determination on whether to actuate a vehicle occupant protective device, the determination of the actuation timing, and the selection of protective devices, on the basis of the results obtained by the relative velocity estimating means and the crash severity estimating means.

It is preferable that the deformation speed detecting means are disposed on left and right front portions of the vehicle, respectively, and the collision detecting device further comprises an assaying means, which assays the size of the collided object or the collided position of the front portion of the vehicle by comparing the outputs of the right and left deformation speed detecting means.

Dispersion of collision determination is attributable to variation in crashing characteristic of the vehicle due to the collided position and the rigidity of the collided object. The collided position and the mode of the collision can be estimated by difference in the deformation speed and deformation amount and/or difference in response time between the left and right sensors, the assay of collision corresponding to the mode of collision (for example, full-overlap, offset, pole, etc.) can be carried out so that there is an advantage of shortening the time required for determination.

It is also preferable that the collision detecting device comprises a collision detecting means employing an acceleration sensor, which detects the deceleration acting on the vehicle frame during a collision, and the acceleration sensor is used as a safing sensor for the result of collision determination obtained by the deformation speed detecting means.

One of the causes of limiting the shortening of the time required for the determination of conventional collision sensors is delay in reaction of a safing sensor. By using the aforementioned detecting means as a safing sensor, there is an advantage of shortening the time required for determination.

It is preferable that the collision detecting device comprises a collision detecting means employing an acceleration sensor, which detects the deceleration acting on the vehicle frame during a collision, and the criteria or the method for the determination of a collision by the acceleration sensor is changed on the basis of the result of collision determination obtained by the deformation speed detecting means.

By making the threshold value for collision determination of the conventional collision sensor more sensitive by information of relative velocity and working mass estimated at the early stage of the collision, there is an advantage of shortening the time required for determination. From delay in time from the time when the bumper front end crashed to the rising of deceleration of the vehicle body and the magnitude of the deceleration of the vehicle during the bumper beam crashes, the velocity and working mass during the collision can be estimated, there is an advantage of shortening the time required for collision determination according to new (changed) criteria for determination and an advantage of shortening the time required for the determination of the collision magnitude.

It is preferable that the collision detecting device further carries out the determination on whether to actuate a vehicle occupant protective device and the determination of the crash severity and the mode of collision on the basis of the running velocity information of the own vehicle.

In case of a collision with a stationary object or a low-speed movable object, the relative velocity during the collision should be substantially equal to the velocity of the own vehicle. By comparing the detected deformation speed with the velocity of the own vehicle, it can be determined whether the object is a movable object or a stationary object. In addition, when it is found that the object is a stationary object, the restraint system is controlled such that it is not actuated if the velocity of the own vehicle is lower than a predetermined value. Accordingly, there is an advantage of simplifying the algorism for determination. Moreover, when it is found that the object is a stationary object, the working mass (inertia mass) relative to the collided object can be discriminated with higher precision from the deformation speed profile and the F-S characteristic of the bumper, thereby improving the precision of determination. For example, the structure facilitates the discrimination whether the object is a sign pole fixed to the ground or a pedestrian. The collision detecting device may detect a collision with a pedestrian.

Even in case of a collision with a pedestrian, the bumper first collides with a lower body of the pedestrian so that the bumper cover is deformed. Therefore, such a collision can be detected by this means. The working mass (inertia mass) of the lower body of the pedestrian can be estimated from the deformation speed profile and the F-S characteristic of the bumper. Therefore, there is an advantage of enabling high precision detection of a collision with a pedestrian.

It is preferable that the collision detecting device comprises a transducer for detecting the deformation of the space, and the transducer is disposed within the bumper beam or at an inner position relative to the bumper beam.

Since the sensor is placed on a relatively high rigid portion at an inner position of the vehicle, the crash can be detected for a longer time including the crash of the bumper beam. There is an advantage that the collision magnitude can be determined with thus detected information. There is also an economic advantage that it eliminates the need for repair and replacement after a minor collision.

BRIEF DESCRIPTION OF THE DRAWINGS

FIG. 8(*b*) is a sectional view of the cylindrical sensor of FIG. 8(*a*);

FIG. 14(*b*) is a cross-sectional view taken along line B—B of FIG. 13;

FIG. 15(*b*) is an output graph of a deformation speed sensor during collision.

DETAILED DESCRIPTION OF THE PREFERRED EMBODIMENTS

Figure 1:
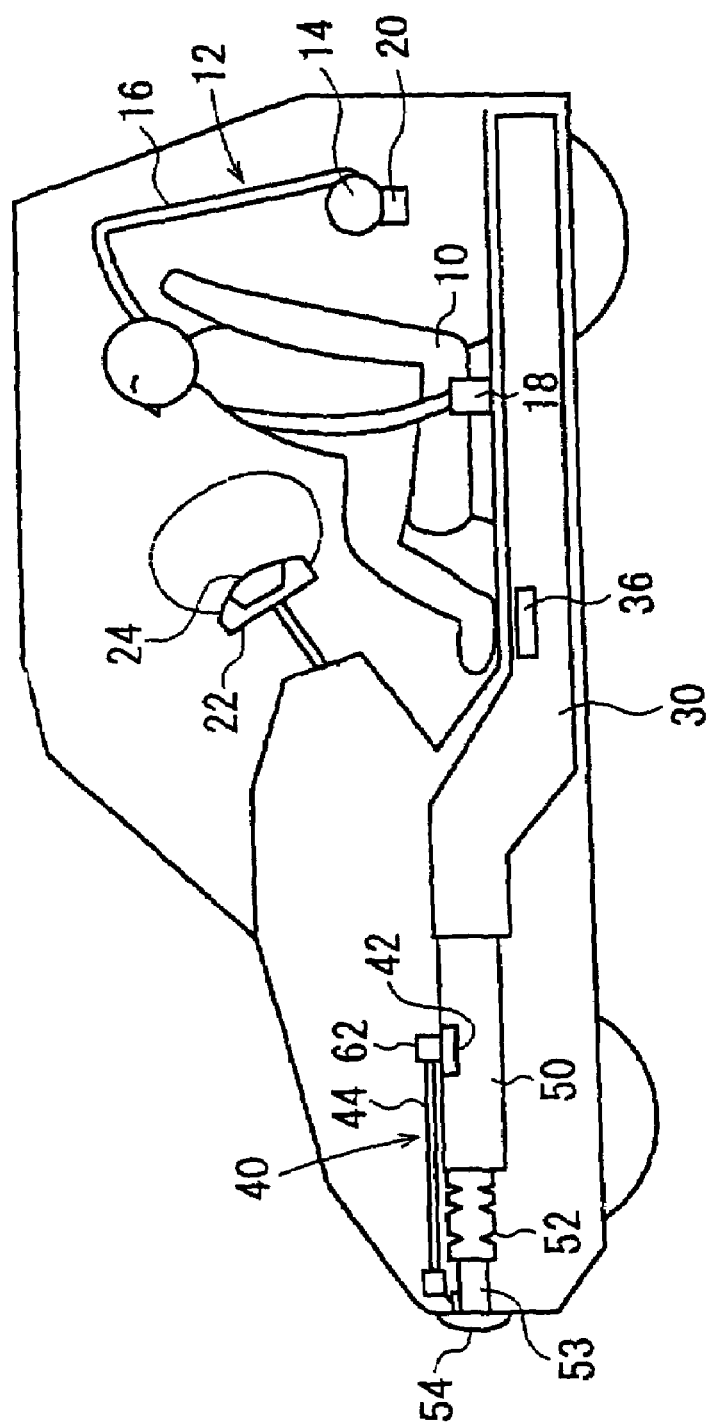
FIG. 1 is a side view of a vehicle equipped with a collision detecting device and a passive safety system according to an embodiment.
Figure 2:
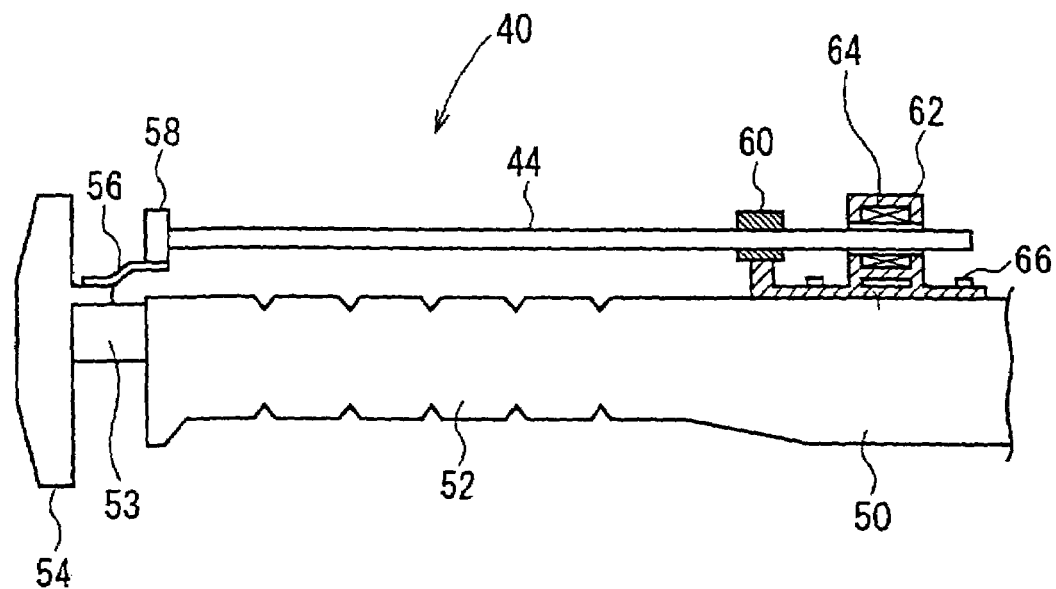
FIG. 2 is a side elevational view of a collision detecting device according to the embodiment of FIG. 1.

Hereinafter, embodiments of the present invention will be described with reference to the attached drawings. FIG. 1 is a schematic side view showing the structure of a vehicle equipped with a collision detecting device and a passive safety system according to the embodiment, FIG. 2 is a side view showing the structure of the collision detecting device, and FIG. 3 is a plan view showing the configuration of a front portion of a vehicle body frame.

A seat 10 is installed in a vehicle cabin of a vehicle, and a seat belt device 12 is installed for restraining an occupant sitting on the seat 10. The seat belt device 12 comprises a retractor 14, a webbing 16 to be withdrawn from the retractor 14, a buckle 18 to be latched with a tongue (not shown) for the webbing 16, and a pretensioner 20 attached to the retractor 14. The pretensioner 20 functions to rapidly wind up a predetermined length of the webbing 16 during a collision.

An airbag device 24 is installed in a steering assembly 22 in front of the seat 10. The airbag device 24 comprises a folded airbag, a module cover for covering the airbag, an inflator (gas generator) for inflating the airbag, and the like.

Figure 3:
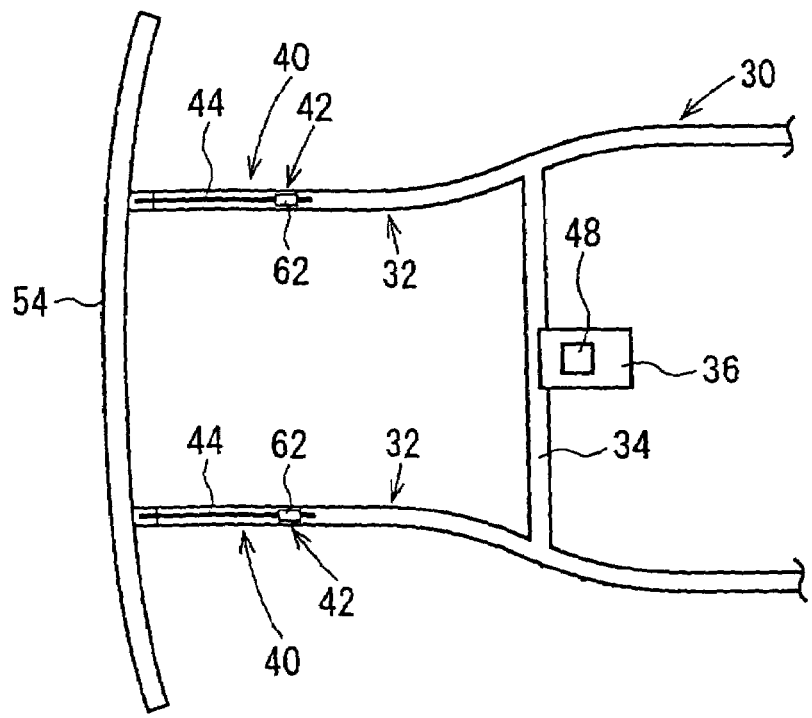
FIG. 3 is a plan view of a vehicle body frame of the vehicle equipped with the collision detecting device and the passive safety system according to the embodiment of FIG. 1.

A vehicle frame 30 comprises side members 32, 32, and a cross member 34 laid to extend between the side members 32, 32 as shown in FIG. 3. Disposed on both the cross member 34 and the floor panel is a control unit 36, which determines the occurrence of a vehicle collision and, then, supplies current to activate the pretensioner 20 and the airbag device 20. Even with a significant severe collision, deformation never reach the cross member 34 so that the control unit 36 can output a control signal through the collision.

In this vehicle, deformation speed sensors 40 and acceleration sensors 42, 48 are installed for detecting a collision against the front of the vehicle (frontal collision). Detection signals of the sensors 40, 42, 48 are inputted into a control circuit in the control unit 36.

The deformation speed sensors 40 and the acceleration sensors 42 are disposed on front portion of the left and right side members 32 of the frame 30. The acceleration sensor 48 is built in the control unit 36. The deformation speed sensors 40 move rods 44 backwards according to the deformation of front end portions of the vehicle and detect the speed of backward movement of the rods 44 so as to determine the deformation speed at the front end portion of the vehicle.

As shown in FIG. 2, low-rigid portions 52 are provided at the front portion of the frame 30 through high-rigid portions 50, respectively. Connected to front ends of the low-rigid portions 52 is a bumper 54. Disposed between the bumper 54 and the low-rigid portions 52 are crash boxes 53, which have low rigidity. The rods 44 extend in the longitudinal (front-to-back) direction of the vehicle and have front ends which are fixed to the bumper 54 through rod fixing plates 58.

The rear ends of the rods 44 are slidably supported by guides 60 so that rear end portions of the rods 44 are loosely inserted into sensor boxes 62, respectively. The sensor boxes 62 are fixed to the high-rigid portions 50, respectively.

In each rod 44, a large number of magnets are aligned serially at predetermined intervals in the longitudinal direction of the rod 44 such that their N poles and S poles are alternatively arranged. Disposed in each sensor box 62 is a magnetic detector 64, such as a coil or a hall element, which senses fluxes from the magnets. The magnetic detector 64 outputs an electric signal of one pulse every time one of the magnets passes through the magnetic detector 64 according to the backward movement of the rod 44. By counting the number of pulses per unit time period, the speed of backward movement of the rod 44 can be detected.

In this embodiment, the acceleration sensor 42 is also provided in the sensor box 62. The guide 60 is integrally formed with the sensor box 62. By installing the sensor box 62, the acceleration sensor 42 and the guide 60 are automatically disposed on the high-rigid portion 50. Numeral 66 designates a bolt for installing the sensor box 62 to the high-rigid portion 50. A circuit for outputting a signal from the magnetic detector 64 and a circuit for outputting an acceleration signal may be partly combined and may be provided on a common circuit board.

When the vehicle equipped with the collision detecting device and the passive safety system having the aforementioned structure comes into a collision, the crash boxes 53 of low rigidity are mainly first to deform. If the collision is medium-scale, the low-rigid portions 52 also deform. If the collision is relatively severe, the high-rigid portions 50 also deform. The crash boxes 53 are portions which first crash after collision and have low rigidity. Therefore, the rise rate in deformation speed of the crash boxes 53 is so high to move the rods 44 backwards at a relatively high speed just after the vehicle collides with an object. The speed of this backward movement is detected from pulses produced by the magnetic detectors 64. When impact maintains even after the crash boxes 53 completely crash, the low-rigid portions 52 are deformed to crash so that the rods 44 continuously move backwards. The speed of the backward movement of the rods 44 is the deformation speed at the front end portion of the vehicle. The deformation speed is substantially in proportion with the relative velocity between the vehicle and the object. The higher the relative velocity is, the severer the collision is. Accordingly, by detecting the speed of the backward movement of the rods 44 from pulses produced by the magnetic detectors 64, the relative velocity to the object during the collision, i.e., the crash severity, can be determined.

In this embodiment, the deformation speed sensors 40 are arranged on the left and right sides of the vehicle. The deformation speeds of the left side and the right side of the vehicle can be separately measured. Therefore, it can be determined whether the present collision is a full overlap collision or an off-set collision.

Also in this embodiment, each sensor box 62, including the magnetic detector 64 for monitoring the speed of the backward movement of the rod 44, is located at a position far from the front end of the vehicle. Accordingly, the sensor box 62 is not directly affected by deformation and distortion due to the collision, and the sensor box 62 is not broken by such a small collision that an area around the bumper is only deformed, thereby cutting the cost for repair and replacement.

Figure 4:
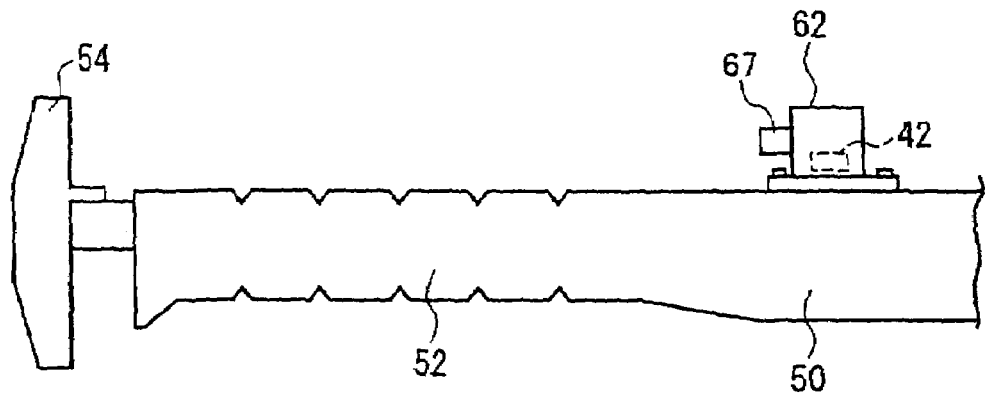
FIG. 4 is a side elevational view of a collision detecting device according to another embodiment.
Figure 5:
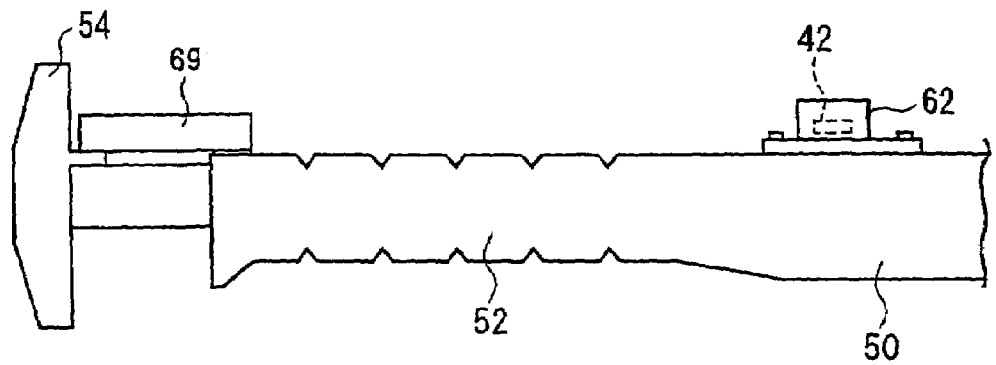
FIG. 5 is a side elevational view of a collision detecting device according to still another embodiment.

FIGS. 4 and 5 are structural illustrations of collision detecting devices according to other embodiments, respectively. In the embodiment shown in FIG. 4, a millimeter wave radar 67 is provided in a sensor box 62 on each high-rigid portion 50 so that the distance between the millimeter wave radar 67 and a bumper 54 is measured. From variations in distance during a collision, the speed of the bumper 54 moving toward the millimeter wave radar 67, i.e., the deformation speed of the low-rigid portion 52, can be detected. The distance may be the distance relative to a front beam, a front grille, or radiator besides the bumper.

To limit the detection portion, a waveguide, such as a wave guide tube, is provided for guiding propagating waves, a reflection plate is fixed to the detection portion, a directional antenna, an inductive lens, or an acoustic lens is provided for converging propagating waves so as to narrow the area. Propagating waves, electromagnetic waves, millimeter waves, light beams, or acoustic waves may be employed. As the detecting method, various methods, such as a relative velocity detecting method using Doppler effects and a distance detecting method using propagation delay time of pulse wave, maybe available. Examples of the suitable sensor include an ultrasonic wave sensor of 40 kHz through 500 kHz, an infrared laser sensor, and a radar of 1 GHz through 24 GHz, but the sensor is not limited thereto.

In the embodiment shown in FIG. 5, a switching element 69 is disposed to extend over each crash box 53. The switching element 69 generates a pulse signal or stops the output of signals the moment a collision occurs. Arranged in the sensor box 62 is only an acceleration sensor 42. From the signal (or variation in signal) of the switching element 69, a control circuit of a control unit 36 detects the moment the vehicle collides with an object. At the same time of the collision, the crash box 53 starts to crash. After that, the low-rigid portions 52 at the front portions of side members 32 crash. During this, the acceleration detected by the acceleration sensor 42 is relatively small. When the crashing deformation reaches high-rigid portion 50, the velocity of forward movement of the vehicle is rapidly reduced so that the acceleration detected by the acceleration sensor 42 is rapidly increased. The deformation speed is obtained by detecting a time period "t" from the moment the signal (or variation in signal) is outputted by the switching element 69 until the acceleration is rapidly changed, and dividing the distance "L" from the switching element 69 to the front end of the high-rigid portion 50 by the detected time period "t". That is, L/t is the deformation speed.

The switching element may be positioned at any location where it can detect the displacement of the bumper. In addition, a plurality of switching elements may be used. In this case, deformation speeds at portions where the switching elements are fixed are obtained. The switching elements may be disposed on a straight line extending in the crashing direction. In this case, the crashing progress, that is, the rate of change in deformation speed, can be obtained.

In any of the aforementioned embodiments, the deformation of the low-rigid portions, including the crash boxes, occurs immediately after the collision and prior to the deformation of the high-rigid portions. The crash severity can be determined from the deformation speed of the low-rigid portions.

In response to the result of the determination of crash severity, the airbag device 24 and/or the pretensioner 20 are activated to operate. Since the period of time from the point of the vehicle collision until the result of determination is obtained is short, it provides enough time for operating the airbag device 24 and the pretensioner. For example, a relatively low-power inflator can be used for inflating the airbag. In addition, the internal pressure of the airbag and the winding-up amount by the pretensioner can be controlled according to the crash severity. The type of collision (full overlap collision, off-set collision) may be also considered in determining the crash severity.

In the present invention, on the basis of both the deformation speed and the acceleration, the occurrence of a collision and the crash severity may be determined. For example, only when the respective results of determinations according to the deformation speed and the acceleration both show that the collision occurs, the determination of the occurrence of the collision may be finally confirmed. In this case, the increased precision of determination is obtained. The reliability of detected value is increased by judging the effectiveness of deformation speed from the deceleration obtained from the acceleration sensor and the amount of deformation, thereby improving the resistance characteristic against malfunction of the occupant protective device due to an impact when running on a rough road, bumping against a curb, or subjected to hammer impact. In this case, the acceleration may be that detected from the acceleration sensor 48 or a combination of those detected from the acceleration sensor 48 and the acceleration sensors 42.

In this present invention, the occurrence of a collision may be determined when either one of detected values of deformation speed and the acceleration exceeds their respective predetermined value. In this case, quite early determination can be obtained.

By using the acceleration sensor as a safing sensor of which measured value is set to be smaller than the value judged by the collision determination, and obtaining a logical product between the acceleration sensor and the deformation speed sensor, the electrical or mechanical malfunction can be prevented. Even when one of the sensors fails, the determination can be carried out only by a plurality of acceleration sensors just like the conventional manner or only by a plurality of deformation speed sensors. The OR structure decision or majority decision may be employed, thereby improving the reliability of collision determination.

In the present invention, the collision detecting device may include a means for calculating the variation in speed of the vehicle body to which the acceleration detecting means is fixed, the variation in moving distance as an integrated value of the variation in speed, or corresponding values of the respective variations, on the basis of the acceleration detected by the acceleration detecting means and its value. In addition, the collision detecting device may include a means for deciding the effectiveness of the detected value of the aforementioned acceleration detecting means or the effectiveness of the result of determination based on the detected value.

In the case of determinations based on both the deformation speed and the acceleration, the evaluation weighting ratio between the deformation speed and the acceleration may be changed according to the magnitude of deformation speed.

In the present invention, the occurrence of a collision or the crash severity may be determined by comparing the acceleration detected by the acceleration sensor 42 to a threshold value. In addition, the threshold value may be set based on the deformation speed.

Further, in the present invention, it may be provided with a deformation amount detecting means for detecting the amount of deformation occurring on the vehicle body. In this case, the determination is made on the basis of the deformation amount and the aforementioned deformation speed. Alternatively, the determination may be made on the basis of the deformation amount, the aforementioned deformation speed, and the aforementioned acceleration.

As the method of detecting the deformation amount, for example, a method of detecting the moving amount of the rod 44 from the count of pulses from the magnetic detector 64 may be employed in the embodiment shown in FIGS. 1 through 3, and a method of detecting the deformation amount of the vehicle body from the variation in distance between the millimeter wave radar 67 and the bumper 54 measured by the millimeter waver radar 67 may be employed in the embodiment shown in FIG. 4, but the method is not limited particularly. Other various methods and measuring devices may be employed.

According to the aforementioned structure, for example, the occurrence of a collision and the crash severity may be determined when either one of detected values of deformation speed and the deformation amount exceeds their respective predetermined value. In this case, quite early determination can be obtained. Alternatively, the determination of the occurrence of the collision may be finally confirmed when the respective results of determinations according to the deformation speed and the deformation amount both show that the collision occurs. In this case, the increased precision of determination is obtained.

In case of determination based on the deformation amount, the deformation speed, and the acceleration, the determination of the occurrence of the collision may be finally confirmed when all of the respective results of determinations according to the deformation amount, the deformation speed, and the acceleration show that the collision occurs. In this case, the increased precision of determination is obtained.

In the present invention, if the respective deformation stresses of portions of a vehicle body are known, a work detecting means may be provided for detecting the work required to deform a portion of the vehicle body when the portion is deformed. In this case, the collision magnitude is determined on the basis of the work detected by the work detecting means. The work is obtained from the product of the aforementioned detected deformation speed, the deformation amount per a predetermined time, and the deformation stress of the deformed portion.

The maximum of the detected deformation speed correlates with the relative velocity, and a value, which is obtained by dividing the work by a square value of the difference speed of the deformation speed in the predetermined time, correlates with the working mass. Accordingly, the relative velocity between a vehicle and an object colliding with the vehicle and the working mass can be estimated at the start of the collision. Based on the relative velocity and the working mass, the total energy of the collision can be estimated so that it can be determined how large the acceleration (deceleration) acting on the vehicle after a lapse of a predetermined time will be, that is, the collision magnitude can be determined. According to the method for determining the collision magnitude on the basis of the work as mentioned above, the collision magnitude can be judged with extremely high precision.

In this structure as mentioned above, the collision magnitude may be judged on the basis of the work and the aforementioned acceleration. When the acceleration of the vehicle is small, the weight of the object colliding with the vehicle can be estimated from the working mass because the working mass corresponds to the equivalent mass of the object. By using this information, the collision magnitude can be judged with further high precision.

If the respective deformation stresses (rigidities) of portions around an end of a vehicle body are known, the collision energy can be detected from the deformation stresses and variation per unit time in deformation speed detected by the deformation speed detecting means. The variation in velocity (deceleration) acting on the vehicle body is in proportion to the collision energy. In the present invention, the collision magnitude may be determined on the basis of the collision energy. The occurrence of a collision is determined and the collision magnitude is judged on the basis of the variation in velocity acting on the vehicle which is obtained from the collision energy, whereby the occurrence of the collision and the collision magnitude can be judged with extremely high precision.

Though the deformation speed sensor is disposed on the front end of the vehicle for detecting a frontal collision in the above embodiment, a deformation speed sensor may be disposed on sides or the rear end for detecting a lateral collision or a rear-end collision.

For sensing a lateral collision, the deformation speed detecting means are placed on sides of the vehicle and detect the distance or the variation in distance in the vehicle lateral direction between a deforming portion, including a peripheral structure, and a stationary portion due to deformation of the vehicle. The deforming portion may be side peripheral portions of the vehicle, including at least door panels, door frames, front fenders, and B-pillars. The aforementioned acceleration detecting means is placed on a vehicle body frame, including side sills, B-pillars, and a center tunnel.

For sensing a rear-end collision, deformation speed detecting means are placed on the rear end of the vehicle and detect the distance or the variation in distance in the vehicle longitudinal (front-to-back) direction between a deforming portion, including a peripheral structure, and a stationary portion due to deformation of the vehicle. The deforming portion may be a rear end portion of the vehicle, including at least a bumper, a bumper beam, and bumper fixing arms. The aforementioned acceleration detecting means is placed on a vehicle structural portion at an inner position relative to the rear end portion of the vehicle.

Referring to FIGS. 6–8, FIGS. 9–11 and FIGS. 12–14(b), collision detecting devices, which can detect deformation speed at a space in a front portion of a bumper beam, will be described.

Figure 6:
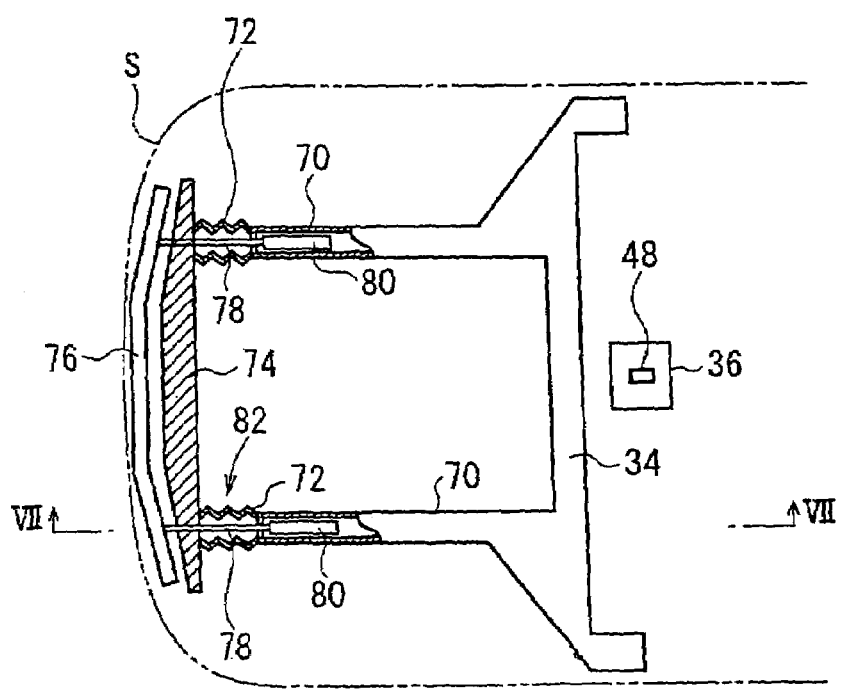
FIG. 6 is a plan view of a collision detecting device according to a different embodiment.
Figure 7:
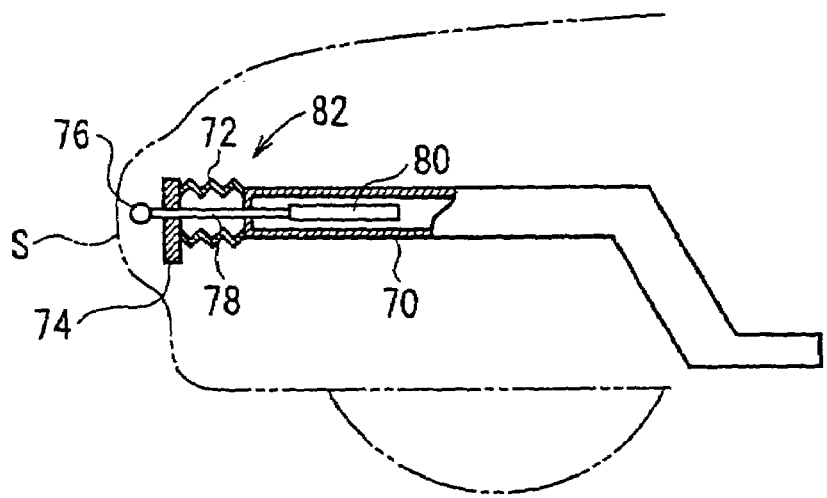
FIG. 7 is a sectional view taken along line VII—VII of FIG. 6.
Figure 8:
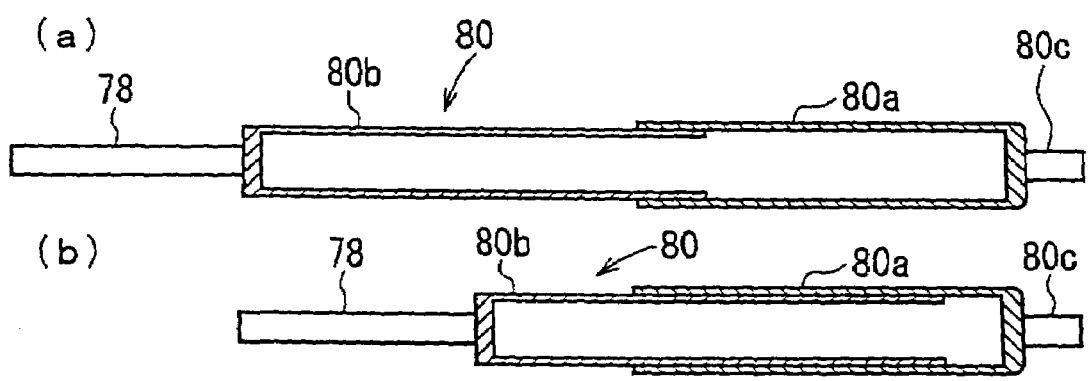
FIG. 8(*a*) is a sectional view of a cylindrical sensor.

In an embodiment shown in FIGS. 6–8, a bumper beam 74 is attached to front ends of side members 70, 70 via crash boxes 72. Disposed in front of the bumper beam 74 is an impact receiving member 76. The impact receiving member 76 extends along the front face of the bumper beam 74 over the portion from the left end to the right end of the bumper beam 74. There is a predetermined space (for example, in a range of 10–40 millimeter) between the impact receiving member 76 and the bumper beam 74. The impact receiving portion 76 is made of a rigid material, such as aluminum.

The impact receiving member 76 is supported at its both side ends by rods 78. The rods 78 are inserted into holes formed in both side ends of the bumper beam 74 in the longitudinal direction of the vehicle. Further, the rods 78 extend through the crash boxes 72 into the side members 70, respectively.

Arranged inside each side member 70 is a cylindrical sensor 80 for detecting the speed of the backward movement of the corresponding rod 78. The cylindrical sensor 80 comprises a cylinder 80a, which is fixed to the side member 70, a piston 80b, which can slide deeply into the cylinder 80a, and an air pressure sensor 80c for detecting the air pressure within the cylinder 80a. Air is sealed inside of the cylinder 80a. The cylindrical sensor 80 is arranged so that its longitudinal direction corresponds to the longitudinal (front-to-back) direction of the vehicle, and the piston 80b is positioned on the front side. The rear end of the rod 78 is connected to the front end of the piston 80b. The front face of the impact receiving member 76 is covered with a bumper cover made of a flexible material, such as a flexible urethane. Mark S designates the outermost surface of the vehicle body. The impact receiving member 76, the rods 80, and the cylindrical sensors 80 compose together an impact detecting device 82.

In the same manner as the aforementioned embodiment, a control unit 36 is disposed on a cross member 34. Arranged in the control unit 36 is an acceleration sensor 48. It should be noted that the acceleration sensor 48 may be omitted.

As the vehicle comes into a frontal collision, the impact receiving member 76 moves astern, whereby the piston 80b is pushed into the cylinder 80a via the rod 78 so as to increase the air pressure inside the cylindrical sensor 80. The increase in air pressure is detected by the air pressure sensor 80c. From the increase in air pressure, the speed of the backward movement of the impact receiving member 76 is detected. In case of a frontal collision, the impact receiving member 76 first moves astern and crashes. Then, the bumper beam 74 crashes and the crash boxes 72 then crash. Because the cylindrical sensors 80 are arranged astern of the crash boxes 72, the crashing profile can be detected. The collided portion can be estimated by comparing the outputs of the left and right sensors 80, 80. For example, from the time difference in rising time of signals of the sensors 80, 80, the collided portion can be estimated.

Though the pressure sensor is used in the embodiment shown in FIGS. 6–8, acceleration sensors may be disposed on the ends of supporting rods, and the speed of displacement of the deforming members may be detected as a product of the acceleration. Alternatively, the displacement sensors utilizing coils may be attached to the rods 78.

Figure 9:
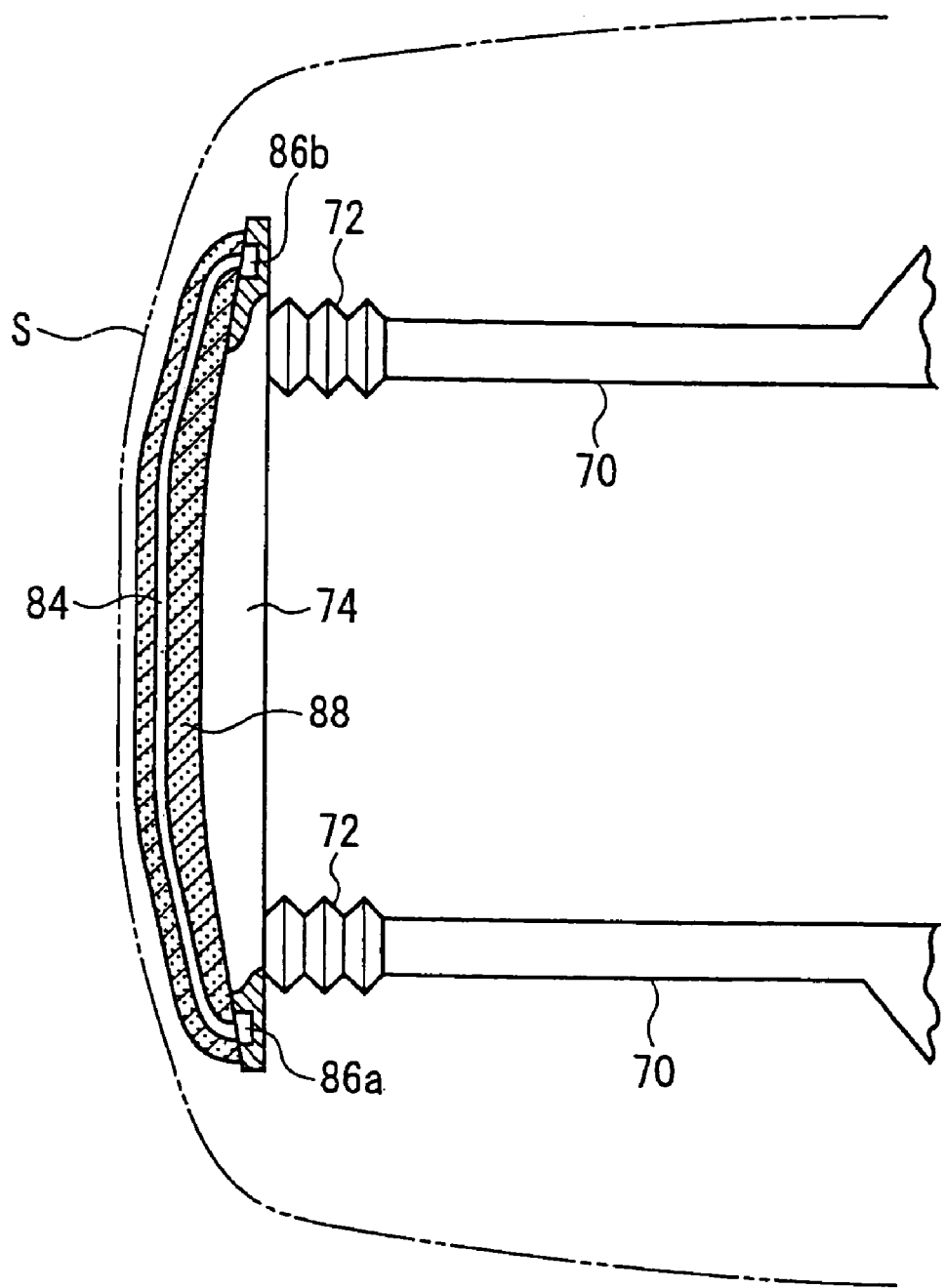
FIG. 9 is a plan view of a collision detecting device according to a further different embodiment.
Figure 10:
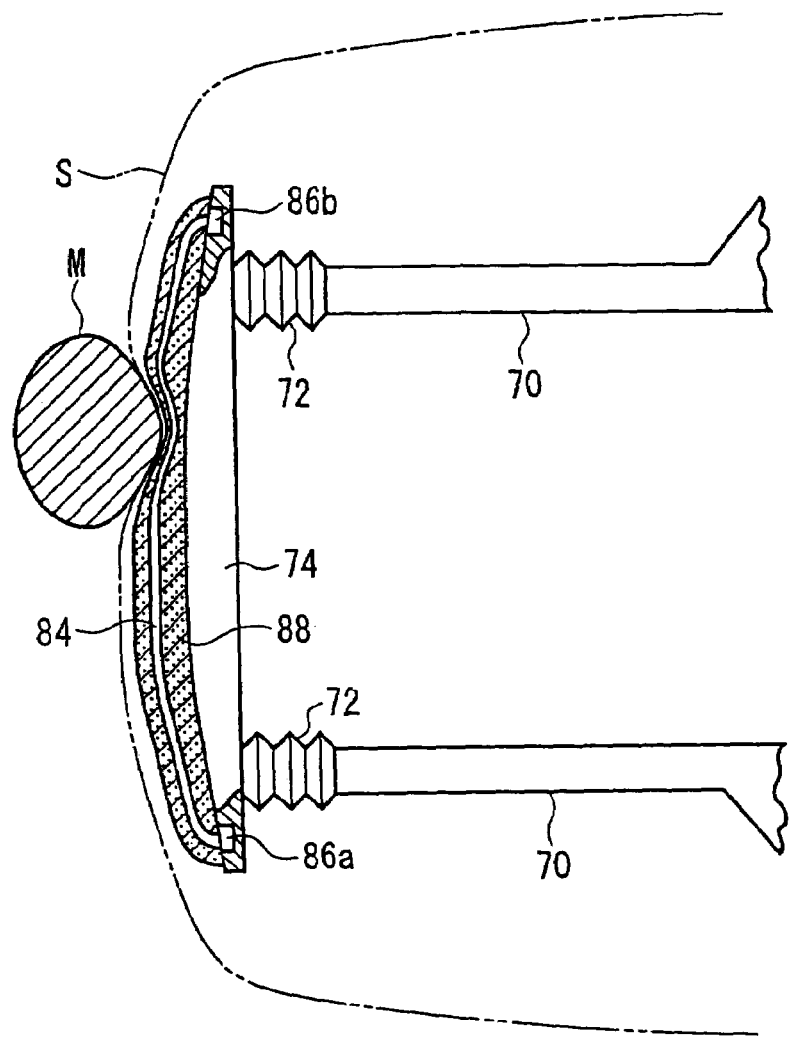
FIG. 10 is a plan view of the operation of the collision detecting device of FIG. 9.
Figure 11:
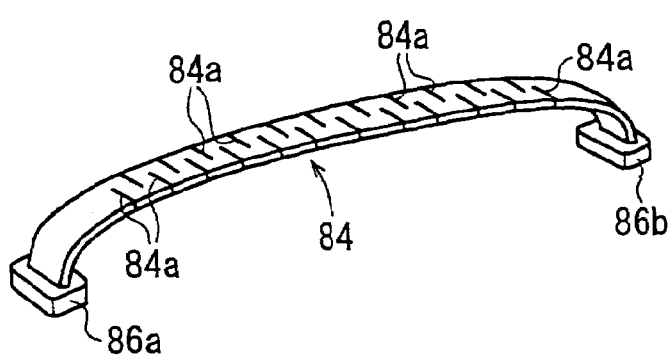
FIG. 11 is a perspective view of an impact receiving member.
Figure 12:
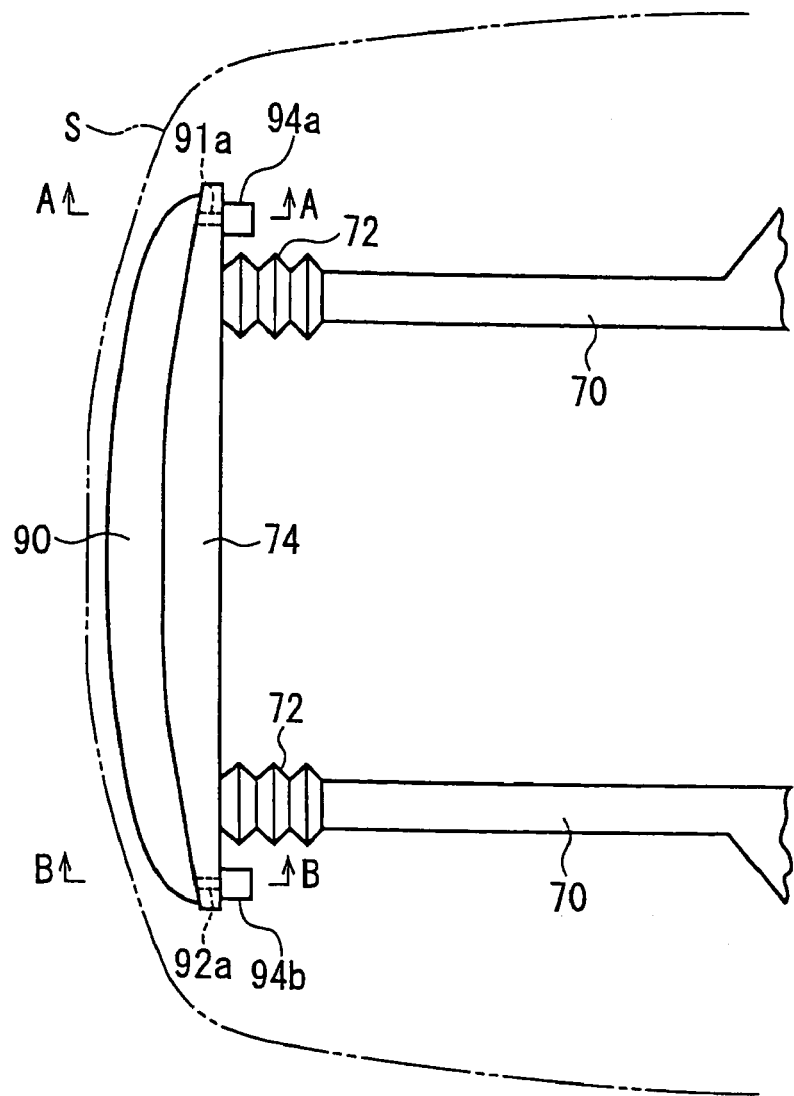
FIG. 12 is a plan view of a collision detecting device according to another embodiment.

Referring to FIGS. 9–11, an embodiment which detects the deformation of an impact receiving member will be described.

A bumper beam 74 is arranged at front ends of side members 70 via crash boxes 72. An impact receiving member 84 is disposed in front of the bumper beam 74 to extend along the front face of the bumper beam 74. The left and right ends of the impact receiving member 84 are attached to the left and right ends of the bumper beam 74. Disposed on the left end of the impact receiving member 84 is a coil 86a. Disposed on the right end of the impact receiving member 84 is a coil 86b. As shown in FIG. 11, the impact receiving member 84 is provided with slits 84a, which are alternately arranged and extend from either of the both edges extending in the longitudinal direction, for facilitating the deformation of the impact receiving member 84 and for enhancing the variation in magnetic permeability when the impact receiving member 84 is deformed. It should be noted that the slits 84a may be omitted.

The impact receiving member 84 is buried in a foamed flexible material 88 such as flexible urethane foam, fixed to the front face of the bumper beam 74. In this embodiment, therefore, a space between the bumper beam 74 and the impact receiving member 84 is filled with the flexible material 88.

The impact receiving member 84 is made of a permeable material, such as a flexible steel plate. The bumper beam 74 is made of steel. The impact receiving member 84, coils 86a, 86b compose together a deformation speed sensor.

As the vehicle comes into a frontal collision, the impact receiving member 84 is, as shown in FIG. 10, deformed by pushing of an object M and is pushed close to or against the bumper beam 74. Thus, the magnetic permeability of s magnetic passage between the coil 86a and the coil 86b varies. From this change, the deformation speed of the space between the bumper beam 74 and the impact receiving member 84 can be detected.

Specifically, the respective self-inductances of the coil 86a, 86b and the mutual inductance between the two coils vary. As the impact receiving member comes closer to the bumper beam, the self-inductance is increased and the mutual inductance is reduced. From the degree of variation in magnetic property, the deformation speed can be estimated.

For example, the coil 86a is driven with sinusoidal wave of 40 kHz as a transmitter and the coil 86b functions as a receiver to detect an induction current or an induced voltage. As the impact receiving member 84 is pushed by the collision of the object, the leakage magnetic flux from the impact receiving member 84 to the bumper beam 74 is increased, and the flux passing through the receiver coil 86b is reduced. The variation in flux is detected by the receiver, whereby the displacement amount and the deformation speed of the impact receiving member 84 can be detected. For reducing the dependency upon the position of impact, the transmitter and the receiver are preferably switched to detect.

The magnetic property of the steel plate itself varies according to the deformation. In case of the impact receiving member 84 provided with the slits 84a, the slits 84a are opened by the deformation of the impact receiving member 84 so as to increase the magnetic resistance of the impact receiving member 84. Therefore, even with slight deformation, the reduction in flux passing through the receiver is drastic, thereby rising the sensitivity of the sensor.

Figure 13:
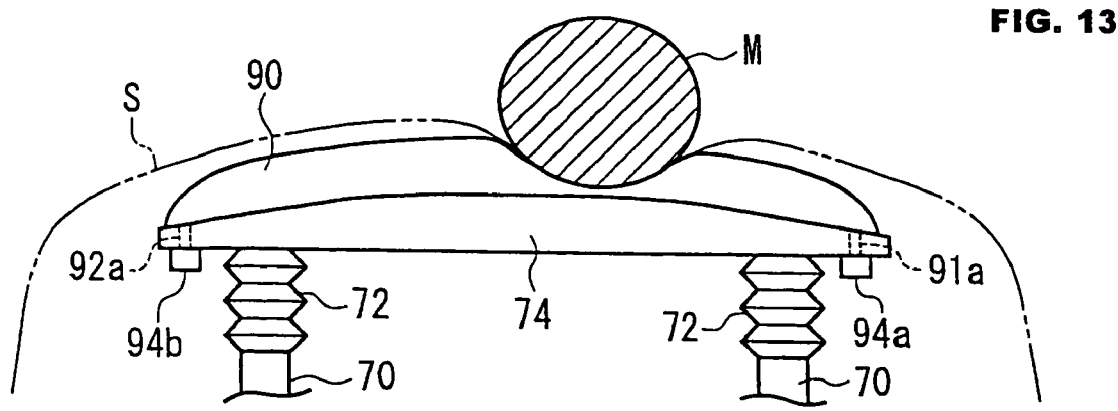
FIG. 13 is a plan view of the operation of the collision detecting device of FIG. 12.
Figure 14:
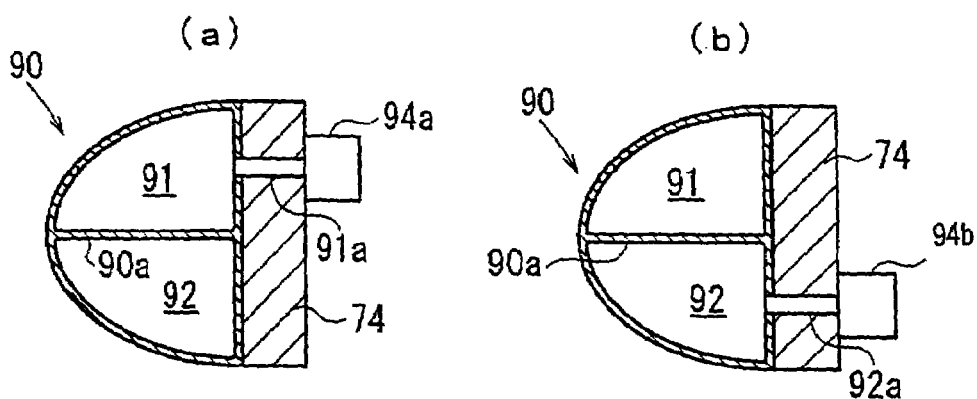
FIG. 14(*a*) is a cross-sectional view taken along line A—A of FIG. 13.
Figure 15:
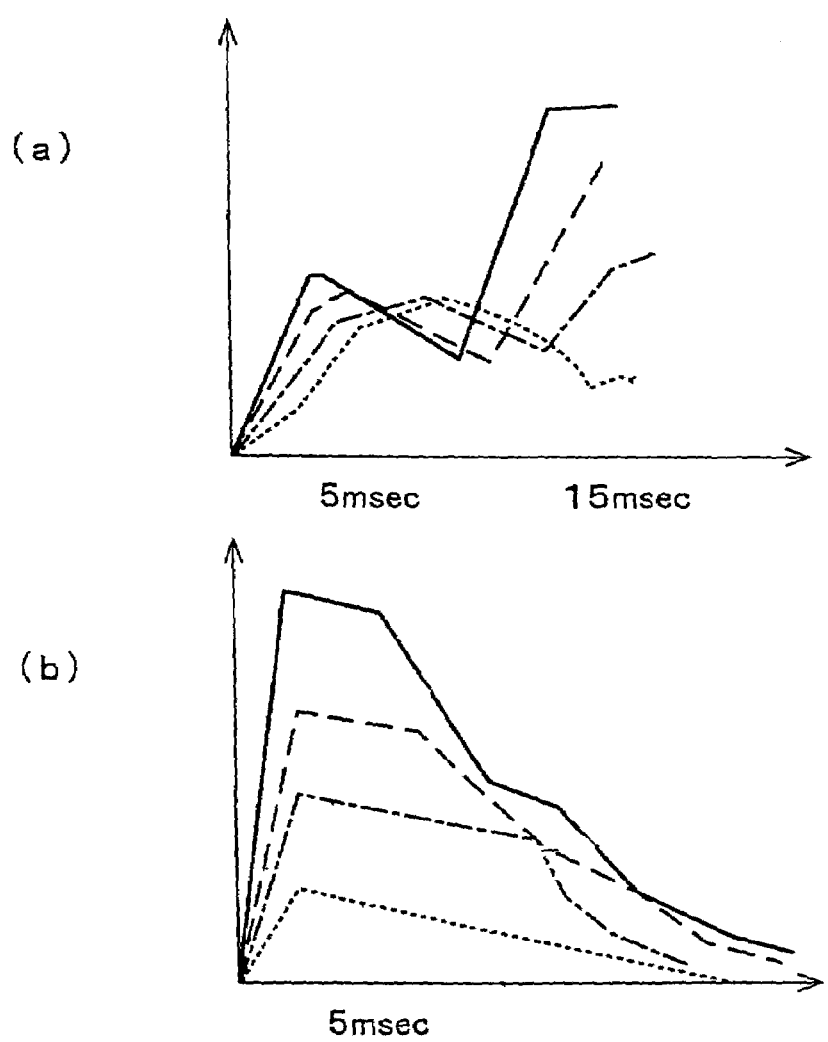
FIG. 15(*a*) is an output graph of an acceleration sensor during collision.

FIGS. 12–14(b) show an embodiment in which the impact receiving member is composed of an air tube. FIGS. 14(a), 14(b) are sectional views taken along a line A—A and a line B—B of FIG. 12, respectively. An air tube 90 extends from the left end to the right end of the bumper beam 74. The inside of the air tube 90 is divided into two chambers, i.e., an upper chamber 91 and a lower chamber 92, by a partition 90a extending in a horizontal lateral direction. The chambers 91, 92 are filled with air. Air pressure sensors 94a, 94b are disposed behind the left and right ends of the bumper beam 74. The air pressure in the upper chamber 91 is introduced into the right-side air pressure sensor 94a through an introduction tube 91a. The air pressure in the lower chamber 92 is introduced into the left-side air pressure sensor 94b through an introduction tube 92a.

As shown in FIG. 13, upon collision of an object M, the air tube 90 is pushed and compressed so as to increase the pressure in the chambers 91, 92. From pressure data detected by the air pressure sensors 94a, 94b, a collision is detected. From the increase speed of the pressure, the deformation speed at a space in front of the bumper beam 74 is detected. From the time difference in rising between two air pressure sensors 94a, 94b, the position of collision with the object M can be computed. It should be understood that, for this computing, it is required to take into account the transmission velocity of air pressure (about 0.31 meter/millisecond at ambient temperatures). In this method according to the variation in volume, variation in air pressure in the air tube 90 depends on the relative velocity relative to the collided object M and the area colliding with the object M. Accordingly, a larger deformation speed is outputted with a collision with a large and rigid object.

The relative velocity relative to a stationary object or a low-speed movable object should be substantially equal to the velocity of the own vehicle. Therefore, by using the running velocity of the own vehicle for collision determination, the size of the collided object can be obtained by comparing the detected deformation speed to the running velocity of the own vehicle. With the detecting result of the collided position, this gets a beneficial effect on detection of a collision with a pedestrian.

In any of the embodiments of the present invention, the deformation speed detected by the deformation speed sensor and the acceleration detected by the acceleration sensor may be not only the original outputs from the sensors but also data which have been treated by filter process or digital process to extract characteristics relating to the deformation speed and the acceleration.

As described in the above, the present invention enables the accurate and early determination of a collision with a vehicle or the like. The present invention enables an occupant protective device to operate accurately and can achieve the reduction in output of an inflator for an airbag. The above embodiments are illustrative examples of the present invention. It should be understood that the present invention may take on other forms different from the examples described above and illustrated in the accompanying drawings.

I claim:

1. A collision detecting apparatus for a vehicle comprising:
at least one impact receiving member operatively connected to a frame member of a vehicle; and
at least one speed detector mounted in a vehicle to be at a predetermined distance from a portion of the impact receiving member to measure deformation speed of the impact receiving member portion around an end or side of the vehicle, the deformation speed being the rate at which a change in the predetermined distance occurs due to the impact receiving member portion moving towards the speed detector in a direction toward the vehicle due to a collision with an object, the speed detector being configured and arranged to immediately detect and begin to measure deformation speed without any delay immediately upon and after the vehicle collision regardless of the level of the impact forces on the impact receiving member causing the change in the predetermined distance.

2. The collision detecting apparatus of claim 1 wherein at least one impact receiving member is a bumper cover disposed along a bumper member of a vehicle.

3. The collision detecting apparatus of claim 1 wherein the speed detector continuously detects the deformation speed of the space from variation in volume of the space.

4. The collision detecting apparatus of claim 3 further comprising at least one controller to evaluate a deformation amount of the space from the deformation speed of the space, to estimate a relative velocity between a vehicle and an object with which the vehicle comes in collision with from the deformation speed of the space, and to estimate a crash severity from the deformation speed of the space.

5. The collision detecting apparatus of claim 4 wherein a signal is generated based on at least one or more of a relative velocity estimate and/or a crash severity estimate to signal the timing of and the selection of actuation of one or more vehicle occupant protective devices.

6. The collision detecting apparatus of claim 1 wherein the at least one impact receiving member has a predetermined rigidity such that an impact received during a collision or displacement is transmitted to the entire at least one impact receiving member.

7. The collision detecting apparatus of claim 1 wherein only the portion of the at least one impact receiving member is moved from an impact received during a collision or displacement.

8. The collision detecting apparatus of claim 1 further comprises an acceleration sensor to detect deceleration acting on a vehicle during a collision, wherein the acceleration sensor is used as a safing sensor for the collision occurrence determination from the speed detector.

9. The collision detecting apparatus of claim 1 further comprises an acceleration sensor to detect deceleration acting on a vehicle during a collision, wherein criteria or method for determining a collision occurrence from the acceleration sensor is changed based on the collision occurrence determination from the speed detector.

10. The collision detecting apparatus of claim 1 wherein there is a determination on whether to actuate a vehicle occupant protective device and a determination of crash severity and mode of collision from running velocity information of a vehicle.

11. The collision detecting apparatus of claim 1 wherein there is a detection of a collision with a pedestrian.

12. The collision detecting apparatus of claim 1 further comprises a transducer to detect the deformation of the space.

13. The collision detecting apparatus of claim 1 wherein the bumper assembly includes the frame member.

14. The collision detecting apparatus of claim 1 wherein the frame member has a low rigid portion and a high rigid portion, and at least a portion of the speed detector is mounted to the high rigid portion.

15. The collision detecting apparatus of claim 1 wherein the frame member extends in one of a transverse direction and a generally parallel direction to the impact receiving member.

16. A collision detecting apparatus for a vehicle comprising:
at least one impact receiving member operatively connected to a frame member of a vehicle; and
at least one speed detector mounted in a vehicle to be at a predetermined distance from a portion of the impact receiving member to measure deformation speed of the impact receiving member portion around an end or side of the vehicle, the deformation speed being the rate at which a change in the predetermined distance occurs due to the impact receiving member portion moving towards the speed detector in a direction toward the vehicle due to a collision with an object, wherein the speed detector continuously measures the deformation speed of the change in the distance from displacement of the at least one impact receiving member relative to a frame member of a vehicle.

17. The collision detecting apparatus of claim 16 wherein a frame member of a vehicle is a bumper member, a bumper cover is disposed along the bumper member, and the at least one impact receiving member is disposed at least in part between the bumper member and the bumper cover.

18. The collision detecting apparatus of claim 16 wherein a frame member of a vehicle is a bumper member, a bumper cover is disposed along the bumper member, and the at least one impact receiving member comprises at least a part of the bumper cover.

19. The collision detecting apparatus of claim 16 wherein a frame member of a vehicle is a bumper member, a bumper cover is disposed along the bumper member, and the at least one impact receiving member is partially located outside of the bumper cover.

20. A passive safety system comprising:
an occupant protection device;
a collision detecting device including at least one impact receiving member disposed along a frame member of a vehicle, a speed detector mounted in the vehicle a predetermined distance from the impact receiving member to measure a deformation speed of at least a portion around an end of the vehicle, the deformation speed being the rate at which a change in the predetermined distance occurs in a direction toward the vehicle due to a collision with an object, and an acceleration detector for detecting acceleration acting on the vehicle; and
a controller configured to determine whether a collision that warrants actuation of the occupant protection device has occurred based on criteria related to the detected acceleration with the controller operable to vary the criteria based on the measured deformation speed due to the collision.

21. The collision detecting apparatus of claim 1 wherein the impact receiving member comprises a bumper assembly.

22. The collision detecting apparatus of claim 21 wherein the frame member has a low rigid portion for being connected to the bumper assembly.

23. The collision detecting apparatus of claim 20 wherein the criteria is a threshold value of acceleration, and the controller is operable to set the threshold value to be lower with large measured deformation speeds, and to set the threshold value to be higher with small measured deformation speeds.

24. A collision detecting apparatus for a vehicle comprising:
at least one impact receiving member operatively connected to a frame member of a vehicle; and
at least one speed detector mounted in a vehicle to be at a predetermined distance from a portion of the impact receiving member to measure deformation speed of the impact receiving member portion around an end or side of the vehicle, the deformation speed being the rate at which a change in the predetermined distance occurs due to the impact receiving member portion moving towards the speed detector in a direction toward the vehicle due to a collision with an object, wherein a speed detector is disposed on at least both left and right front portions of a vehicle and further comprises a controller to evaluate size and position of a collided object at the vehicle by comparing the deformation speed from the right and left speed detectors.

25. A collision detecting apparatus for a vehicle comprising:
at least one impact receiving member operatively connected to a frame member of a vehicle;
at least one speed detector mounted in a vehicle to be at a predetermined distance from a portion of the impact receiving member to measure deformation speed of the impact receiving member portion around an end or side of the vehicle, the deformation speed being the rate at which a change in the predetermined distance occurs due to the impact receiving member portion moving towards the speed detector in a direction toward the vehicle due to a collision with an object, wherein the frame member has a low rigid portion and a high rigid portion, at least a portion of the speed detector is mounted to the high rigid portions, and the speed detector comprises an energy emitter mounted to the high rigid portion.

26. A collision detecting apparatus for a vehicle comprising:
at least one impact receiving member operatively connected to a frame member of a vehicle:
at least one speed detector mounted in a vehicle to be at a predetermined distance from a portion of the impact receiving member to measure deformation speed of the impact receiving member portion around an end or side of the vehicle, the deformation speed being the rate at which a change in the predetermined distance occurs due to the impact receiving member portion moving towards the speed detector in a direction toward the vehicle due to a collision with an object; and a controller to estimate, from a profile generated from deformation speeds measured over time and a load-deformation characteristic of the distance, a relative velocity between a vehicle and an object which the vehicle come in collision with or the working mass of the object.

27. The collision detecting apparatus of claim 26 wherein a signal is generated based on at least one or more of the deformation speeds, the relative velocity estimates and/or the working mass estimate to signal the timing of and the selection of actuation of one or more vehicle occupant protective devices.

* * * * *